United States Patent [19]
Bampton

[11] Patent Number: 5,697,511
[45] Date of Patent: Dec. 16, 1997

[54] TANK AND METHOD OF FABRICATION

[75] Inventor: Clifford C. Bampton, Thousand Oaks, Calif.

[73] Assignee: Boeing North American, Inc., Seal Beach, Calif.

[21] Appl. No.: 722,534

[22] Filed: Sep. 27, 1996

[51] Int. Cl.⁶ ............................................. B65D 87/00
[52] U.S. Cl. .................... 220/4.12; 220/612; 228/112.1; 228/114.5; 228/180.1
[58] Field of Search ........................ 220/4.12, 612; 228/112.1, 114.5, 180.1; 29/402.09, 402.18

[56] References Cited

U.S. PATENT DOCUMENTS

| | | | |
|---|---|---|---|
| 3,412,891 | 11/1968 | Bastone et al. | 220/4.12 |
| 3,864,812 | 2/1975 | Fiegel et al. | 29/471.1 |
| 3,918,628 | 11/1975 | Clavey | 228/213 |
| 4,039,115 | 8/1977 | Randolph et al. | 228/44.5 |
| 4,241,843 | 12/1980 | Walker et al. | 220/4.12 |
| 4,624,388 | 11/1986 | Chang et al. | 220/435 |
| 4,724,975 | 2/1988 | Leventey | 220/4.12 |
| 5,102,005 | 4/1992 | Trussler | 220/4.12 |
| 5,217,140 | 6/1993 | Lindahl | 220/4.12 |
| 5,320,247 | 6/1994 | Sharp | 220/654 |
| 5,460,317 | 10/1995 | Thomas et al. | 228/112.1 |

FOREIGN PATENT DOCUMENTS 9405491.3  3/1994  United Kingdom.

*Primary Examiner*—Joseph Moy
*Attorney, Agent, or Firm*—Harry B. Field; Steven E. Kahm

[57] ABSTRACT

In the construction of cylindrical tanks having end domes wherein the domes are attached by stir friction welding, a wagon wheel is placed inside the tank at the interface of the tank cylinder and the dome such that it provides backup support for the pressure exerted by the stir friction welding tool and strengthens the weld area and the tank by being welded into the tank by the stir friction welding process.

11 Claims, 2 Drawing Sheets

TANK AND METHOD OF FABRICATION

BACKGROUND OF THE INVENTION

1. Field of the Invention

This invention relates to the welding of tanks. It particularly relates to the assembly of aluminum alloy pressurized tanks utilizing friction stir welding (FSW) technology.

2. Background Information

Welding technology is well-known. For example, solid-state welding processes such as diffusion welding have been utilized as specialized processes for certain unique metallurgical applications. Friction welding is a solid-state joining process that produces coalescence by the heat developed between two surfaces by mechanically induced rubbing motion. Friction welding has certain basic limitations, among which are preparation and alignment of the work pieces which may be critical for developing uniform rubbing and heating, particularly with large diameters. Thus, despite the many different types of welding technology processes utilized in the past and at present, technical problems with joining high strength aluminum alloys are recognized as a primary constraint to both wider implementation of aluminum in automotive structures, and to further improvement in cost and weight savings in aluminum aerospace structures.

A new process designated as friction stir welding offers a unique and revolutionary method for joining aluminum alloys, offering a new design in production welding opportunities for low-cost high-performance aluminum structures particularly. Basically, friction stir welding joins aluminum alloys (and copper alloys) by plasticizing, and then consolidating the material about the joint line. This operation is achieved by sinking a non-consumable pin into the start of the joint. This pin of a non-consumable material such as steel, and harder than the workpiece material, softens and plasticizes the aluminum by friction heating. The pin is then rotated and moved in the direction of welding. When the pin is rotated, the friction heats an annular region of aluminum alloy around the pin. As the pin is moved in the direction of welding, the pressure provided by the leading face of the pin forces hot plasticized material to the back of the pin, where it fills in the void left by the moving pin. No melting occurs, and the weldment is left in a fine-grained, hot-worked condition, with no entrapped oxides or gas porosity.

The techniques of friction stir welding are described in U.S. Pat. No. 5,460,317, which is incorporated herein by reference.

Friction stir welding, because of its many advantages, is being considered as an attractive process for the assembly of aluminum tanks, particularly large aluminum alloy pressurized tanks, such as those utilized for cryogenic oxygen storage in space launch systems. Because of the large compressive forces involved in friction stir welding, the final welds in these tank structures present a problem of how to adequately provide backing support inside the tank, particularly when access to the tank interior is restricted.

It is an object of this invention to provide a support structure member inside a cylindrical tank body, particularly one of aluminum, for supporting the walls of the tank body.

It is a further object of this invention to provide the support structure member to act as a rigid backing support for the welded joints.

It is still a further object of this invention that the support structure member also act as an integral part of the load carrying pressure vessel of the finished tank so that the support structure does not have to be disassembled and removed from the completed tank.

It is yet a further object of this invention that the support structure member resist outward expansion of the tank under the pneumatic forces of the pressurized gas in the tank.

It is another object of this invention to provide a support structure that is designed to optimize weight savings in the final tank, as well as cost savings in the fabrication of the tank.

SUMMARY OF THE INVENTION

The present invention provides a general solution to the backing support problem during final friction stir welding of joints in an aluminum tank assembly. An internal aluminum structure is used that provides not only tooling for backing support during the friction stir welding process, but also acts as an integral part of the tank pressure vessel in the final product so that the disassembling of the support structure and its removal from the completed tank are avoided. In its preferred embodiment, a "wagon wheel" configuration, is used as the internal integral tool and tank support. The wagon wheel is preferably fabricated from the same aluminum alloy as the tank shell. Thus, for the final circumferential weld to assemble a hemispherical dome tank end on to a cylindrical tank body, the rim of the wagon wheel preferably overlaps and supports the butt joint between the tank dome and the tank cylinder. The wagon wheel may be forced to fit tightly by shrink-fitting with cryogenic cooling of the wagon wheel prior to fitting inside the partially assembled tank. The joint is then made by friction stir welding so that the three members, the dome, the cylinder and the wagon wheel, are simultaneously welded in a three body joint. During the friction stir welding process, the wagon wheel acts as a rigid backing support for the dome to cylinder circumferential butt joint. In the finished tank, the wagon wheel acts as an integral part of the load carrying pressure vessel by resisting outward expansion of the tank under the pneumatic forces of the pressurized gas in the tank through the three body weld.

DESCRIPTION OF THE PREFERRED EMBODIMENTS

The present invention provides a welded tank vessel, generally of cylindrical configuration, and capable of resisting outward expansion under the pneumatic forces of the pressurized gas present therein. The design, construction, and features of this vessel and the method of fabricating it will be more fully understood by reference to the attached drawings which depict certain exemplary embodiments of the invention.

Figure 1:
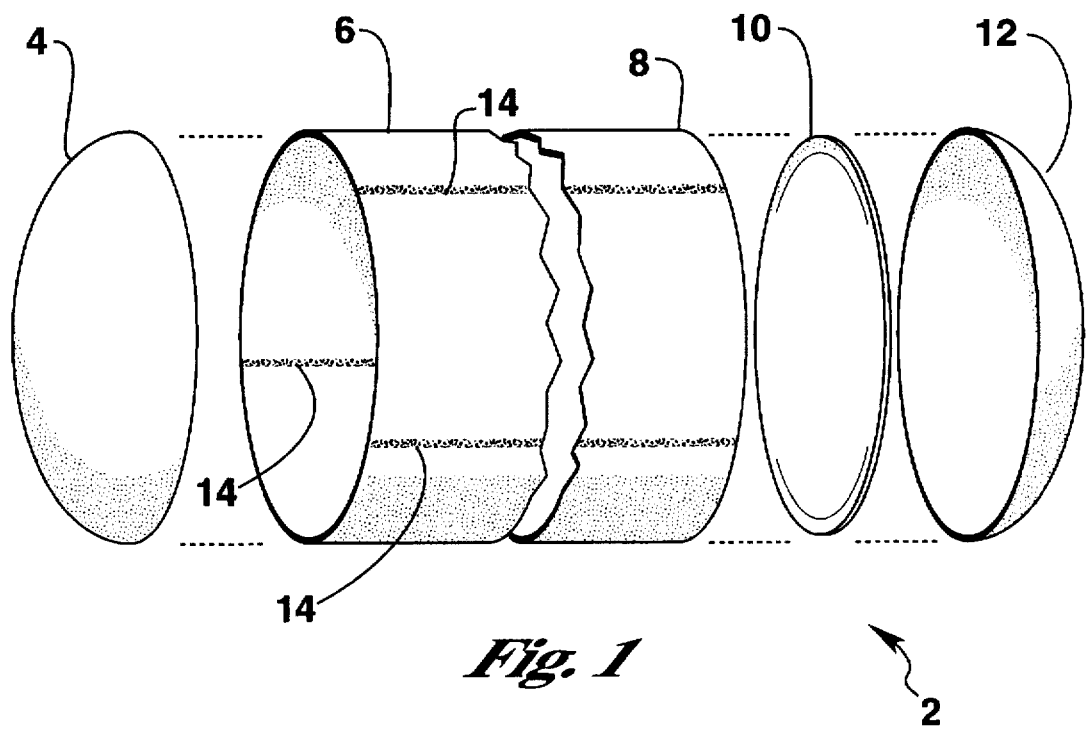
FIG. 1 is an exploded perspective view of a tank built in accordance with the present invention.
Figure 2:
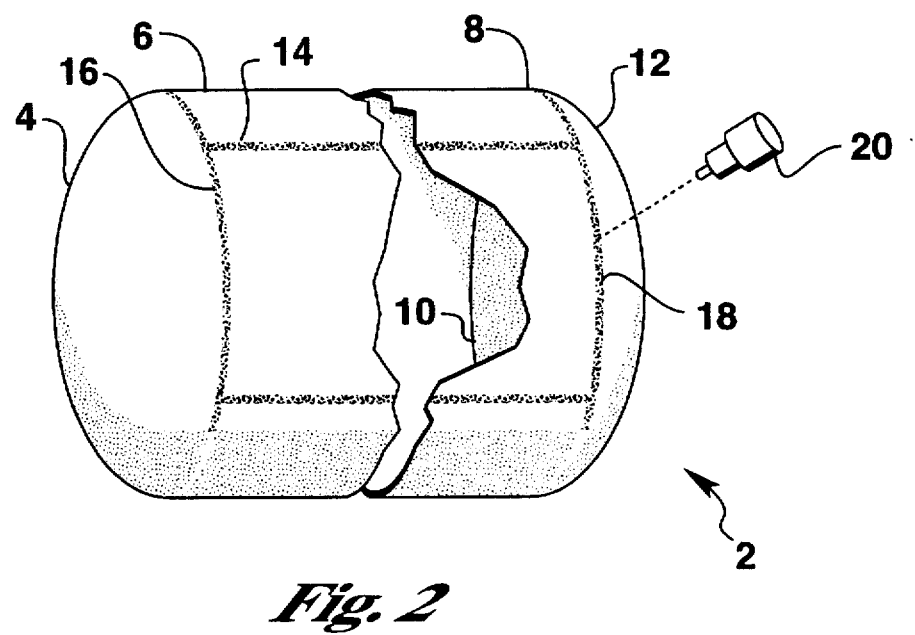
FIG. 2 is a cutaway perspective assembled view.

Referring now to FIGS. 1 and 2 of the drawings, therein is shown a preferred tank 2 of the present invention. A tank dome 4 is suitably joined to a tank body 6 by a circumferential weld 16, requiring either removable backing tooling or an integral backing plate. In other embodiments, the tank body 6 may be formed as a unitary structure with the tank dome 4 as an integral part thereof, particularly if the tank is relatively small. Alternatively, the tank dome closure 4 may be joined to the tank body 6 as the final step in the assembly of the tank vessel.

In its preferred aspects, a body end 8 of tank 2 together with a backing plate 10 and a dome head 12 are joined together in a three-part circumferential weld 18. As an example, for the final circumferential weld 18 used to join a hemispherical dome tank 12 to the cylindrical end 8 of the tank body 6, plate 10 may be in the form of a wagon wheel configuration serving as the internal integral tool and tank support. The wagon wheel 10 is preferably fabricated from the same aluminum alloy as the tank 6. The rim of the aluminum wagon wheel 10 preferably overlaps and supports the butt joint between the tank dome 12 and the tank cylinder end 8. The wagon wheel 10 may be forced to fit tightly by shrink fitting it with cryogenic cooling prior to fitting it inside the partially assembled tank. Weld 18 is then made by friction stir welding in order that the three members, the dome 12, the cylinder body end 8 and the backing plate or wagon wheel 10, are simultaneously welded in a three-part joint using a friction stir welding tool 20. Because of the pressure exerted during the friction stir welding process, the wagon wheel 10 acts as a rigid backing support for the dome to cylinder circumferential butt joint. In the finished tank, the wagon wheel acts as an integral part of the load carrying pressure vessel by resisting outward expansion of the tank under the pneumatic forces of the pressurized gas in the tank following the three-body weld. The wagon wheel is therefore designed to optimize weight savings in the final tank, as well as cost savings in the fabrication of the tank.

Figure 3:
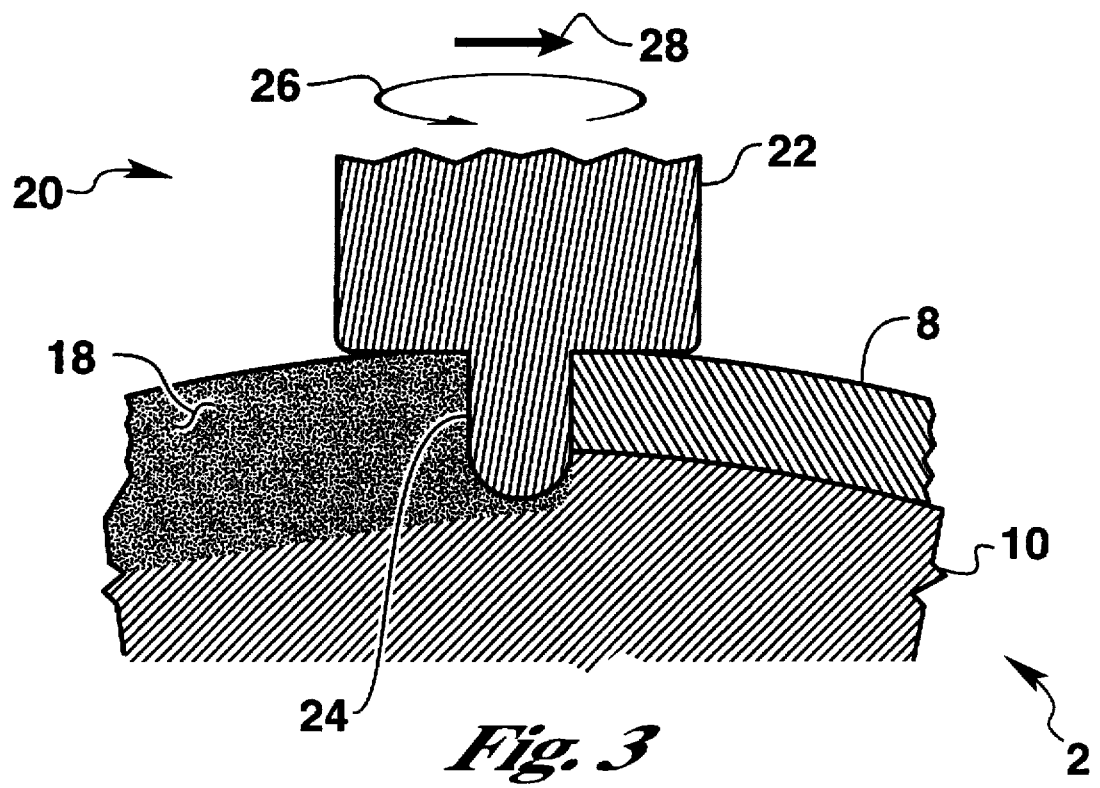
FIG. 3 is an axial section taken through the circumferential weld and the backing plate.
Figure 4:
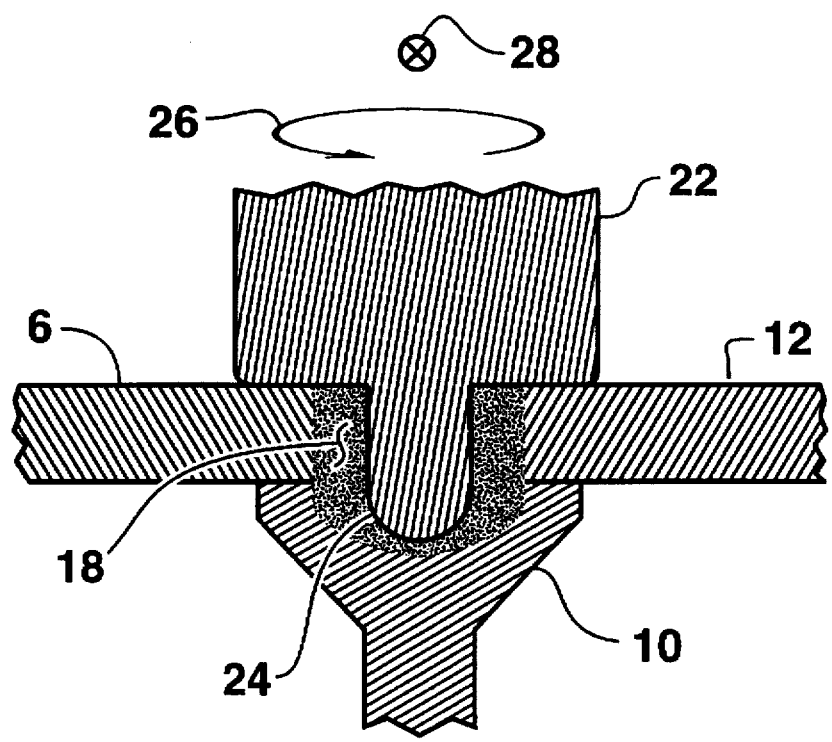
FIG. 4 is a tangential section taken through weld no. 18.

Referring to FIGS. 3 and 4 of the drawing, where similar numerals refer to similar parts, a rotating tool spindle 22 is shown terminating in a friction pin 24, where direction 26 represents the direction of the spindle and pin rotation. Direction 28 represents the direction of the welding advance. As noted in FIGS. 3 and 4, a three-part circumferential weld 18 is thereby achieved by the action shown of the friction stir welding tool 20.

It will be appreciated that the primary function of support structure member 10 is to act as a backing plate or tool during the friction stir-welding operation. Its subsequent function, for certain applications, as an integral part of the pressure vessel structure avoids the necessity to remove a massive tool from the assembled tank. This may be of particular importance where the pressurized tank is utilized for cryogenic oxygen storage in space launch systems where weight constraints are significant, particularly when access to the tank interior is restricted. Once the tank has been assembled, depending upon the application, such as in space launch systems, oxygen may be added to the tank interior through ports (not shown) which are then subsequently sealed.

It will, of course, be realized that various modifications can be made in the design and operation of the tank formed in the present invention without departing from the spirit thereof. Thus, it should be understood that within the scope of the appended claims, the invention may be practiced, otherwise than as specifically illustrated and described.

What is claimed is:

1. A tank vessel of predetermined length having a cylindrical body and a at least one domed tank end member, said tank being capable of resisting outward expansion thereof under the pneumatic forces of a pressurized gas present therein comprising an elongated cylindrical tank body having a support structure member therein for supporting the walls of said tank body, a domed tank end member in contact with the body of said tank end with the support structure member, said tank end forming a cylindrical butt joint with said cylindrical tank body, the rim of the support structure member overlapping and supporting the butt joint between the tank dome and the tank cylinder body, all three members being simultaneously jointed by utilization of a friction stir welding .process in a three-body joint so that the support structure member acts as a rigid backing support for the domed cylinder circumferential butt joint, and subsequently acts as an integral part of the load-carrying pressure vessel of the finished tank, thereby resisting outward expansion of the tank under the pneumatic forces of the pressurized gas in the tank.

2. The tank of claim 1 wherein the combined welded and pressure vessel support structure member is in the form of a wagon wheel configuration integrally attached to the dome and cylinder circumferential butt joint.

3. The tank of claim 2 wherein the wagon wheel, the tank body and the tank dome are fabricated from one or more aluminum alloys.

4. The tank of claim 3 wherein the wagon wheel, the tank body and the tank dome are fabricated from the same aluminum alloy.

5. A method for forming a tank vessel resistant to outward expansion of the tank under the pneumatic forces of a pressurized gas contained therein, comprising providing a partially assembled tank, tightly fitting a support structure member within the tank body, butt-joining a cylindrical dome end to said tank body, and assembling the tank by utilizing friction stir welding so that the cylindrical body, the support structure member and the dome are simultaneously welded in a three-body joint while utilizing the support structure member for the friction stir welding process.

6. The process of claim 5 wherein the support structure member is in the form of a wagon wheel configuration.

7. The process of claim 6 wherein the wagon wheel is fitted tightly into the cylindrical body by shrink fitting the wagon wheel by cooling it prior to fitting it inside the partially assembled tank and then allowing the wagon wheel to thermally expand to fit tightly inside the tank.

8. The process of claim 7 wherein a cryogenic gas is utilized for the cooling of the wagon wheel so as to allow a tight shrink-fit of the wagon wheel inside the tank cylinder.

9. The process of claim 7 wherein the rim of the wagon wheel overlaps and supports the butt joint between the tank dome and the tank cylindrical body, and wherein the wagon wheel, the tank dome and the tank cylindrical body are then simultaneously welded in a three-body joint by utilization of friction stir welding, which requires a strong, rigid backing support structure.

10. The process of claim 6 wherein prior to friction stir welding, the tank vessel, the dome and the wagon wheel are fabricated from one or more aluminum alloys.

11. The process of claim 10 wherein the tank vessel, the dome and the wagon wheel are fabricated from the same aluminum alloy.

* * * * *